(12) United States Patent
Lack

(10) Patent No.: US 6,584,391 B2
(45) Date of Patent: Jun. 24, 2003

(54) ENGINE TORQUE CALCULATION

(75) Inventor: Adam C. Lack, Oak Park, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 2 days.

(21) Appl. No.: 09/911,266

(22) Filed: Jul. 23, 2001

(65) Prior Publication Data

US 2003/0017911 A1 Jan. 23, 2003

(51) Int. Cl.[7] .............................................. B60K 41/04
(52) U.S. Cl. ..................... 701/51; 477/115; 123/406.23; 123/406.24; 123/406.46; 475/125
(58) Field of Search ......................... 701/51, 102, 101, 701/54; 477/120, 124, 109, 123, 113, 110, 111, 115; 123/205, 406.23, 406.24, 406.25, 406.26, 406.3, 406.36, 406.46, 406.47; 475/125, 126, 257

(56) References Cited

U.S. PATENT DOCUMENTS 5,484,351 A * 1/1996 Zhang et al. ................ 477/113
5,509,867 A * 4/1996 Genise ........................ 477/120
6,035,252 A * 3/2000 Dixon et al. ................ 701/102

* cited by examiner

Primary Examiner—Thomas G. Black
Assistant Examiner—Tuan C To
(74) Attorney, Agent, or Firm—Dennis Kelly Sullivan; Susan L. Lukasik; Jeffrey P. Calfa

(57) ABSTRACT

A torque calculator and method for providing real time data that measures net torque output of a running engine in a motor vehicle. Gross torque production is calculated using engine speed and fueling data. Torque losses due to accessories, pumping, and friction are calculated and subtracted from gross torque production, and inertial torque is also accounted for to yield engine net running torque. The engine net running torque data and engine speed data are processed according to a filter algorithm that compensates the engine net running torque data for engine speed. Transmission shifting is controlled by the speed-compensated engine net running torque.

16 Claims, 4 Drawing Sheets

FIG. 2A

VARIABLES

| NAME | SCALING | DESCRIPTION/UNITS | UNITS |
|---|---|---|---|
| | | INPUT VARIABLES | |
| N | | ROTATIONAL ENGINE SPEED | RPM |
| MAP_KPA | | MANIFOLD ABSOLUTE PRESSURE | KPa ABSOLUTE |
| EBP_KPA | | EXHAUST BACK PRESSURE | KPa ABSOLUTE |
| MFDES | | MASS FULL DESIRED | mg/stk |
| EOT_C | | ENGINE OIL TEMPERATURE | deg C |
| ICP_MPA | | INJECTION CONTROL PRESSURE | MPa |
| HI_ALT_BP_MULT | | HIGH ALTITUDE COMPENSATION SLEW MULTIPLIER | - |
| MED_ALT_BP_MULT | | MEDIUM ALTITUDE COMPENSATION SLEW MULTIPLIER | - |
| LO_ALT_BP_MULT | | LOW ALTITUDE COMPENSATION SLEW MULTIPLIER | - |
| ENG_ENABLEFLG | | ENGINE FAN ENABLE FLAG | INTEGER |
| ACR | | AIR CONDITIONING PRIMARY UNIT ACTIVE FLAG (1=ACTIVE) | INTEGER |
| ACCYFLG1 | | ACCESSORY LOADING PRIMARY UNIT ACTIVE FLAG (1=ACTIVE) | INTEGER |
| ACCFLG2 | | ACCESSORY LOADING SECONDARY UNIT ACTIVE FLAG (1=ACTIVE) | INTEGER |
| MAF_MG_STK_COMP | | MASS AIR FLOW | mg/stk |
| BG_TIMER | | EXECUTION RATE OF STRATEGY | SECONDS |
| | | OUTPUT VARIABLES | |
| TQ_FILT | | OUTPUT TORQUE ESTIMATE OF ALGORITHM | ft-lbs |

CALIBRATION SCALARS

| NAME | SCALING | DESCRIPTION/UNITS | BINARY POINT |
|---|---|---|---|
| TQ_AIRPMP_ACT_FLG | | AIR PUMPING LOSSES STRATEGY ACTIVATION FLAG | |
| TQ_COMB_ACT_FLG | | COMBUSTION EFFECTS STRATEGY ACTIVATION FLAG | |
| TQ_ICPBASE | | BASELINE ICP VALUE DETERMINED AT TIME OF FRICTION TABLE CALIBRATION | |
| TQ_INERTIA | | TOTAL ENGINE INERTIA (ft-lb/rpm/sec) | |

FIG. 2B
VARIABLES
(CON'T)

| NAME | SCALING | DESCRIPTION/UNITS | UNITS |
|---|---|---|---|
| | | LOCAL VARIABLES | |
| TQ_DP_HIALT | | HIGH ALTITUDE BOOST-BACK PRESSURE BASELINE TABLE OUTPUT | KPa ABSOLUTE |
| TQ_DP_MEDALT | | MEDIUM ALTITUDE BOOST-BACK PRESSURE BASELINE TABLE OUTPUT | KPa ABSOLUTE |
| TQ_DP_LOALT | | LOW ALTITUDE BOOST-BACK PRESSURE BASELINE TABLE OUTPUT | KPa ABSOLUTE |
| TQ_DP_HIALT_TERM | | SLEWED HIGH ALTITUDE CONTRIBUTION TO BOOST-BACK PRESSURE BASELINE | KPa ABSOLUTE |
| TQ_DP_MEDALT_TERM | | SLEWED MEDIUM ALTITUDE CONTRIBUTION TO BOOST-BACK PRESSURE BASELINE | KPa ABSOLUTE |
| TQ_DP_LOALT_TERM | | SLEWED LOW ALTITUDE CONTRIBUTION TO BOOST-BACK PRESSURE BASELINE | KPa ABSOLUTE |
| TQ_DELTAP_NORM | | ALTITUDE COMPENSATED BOOST-BACK PRESSURE BASELINE | KPa ABSOLUTE |
| TQ_DELTAP | | ACTUAL BOOST-BACK PRESSURE | KPa ABSOLUTE |
| TQ_DELTAP_ERR | | DEVIATION OF ACTUAL BOOST-BACK FROM BASELINE BOOST-BACK PRESSURE | KPa ABSOLUTE |
| TQ_AIR_PUMP | | COMPUTED AIR PUMPING LOSSES | ft-lbs |
| TQ_HIALT_BASE | | HIGH ALTITUDE SPEED AND FUELING TABLE OUTPUT | ft-lbs |
| TQ_MEDALT_BASE | | MEDIUM ALTITUDE SPEED AND FUELING TABLE OUTPUT | ft-lbs |
| TQ_LOALT_BASE | | LOW ALTITUDE SPEED AND FUELING TABLE OUTPUT | ft-lbs |
| TQ_HIALT_TERM | | SLEWED HIGH ALTITUDE COMPENSATED SPEED AND FUELING ESTIMATE | ft-lbs |
| TQ_MEDALT_TERM | | SLEWED MEDIUM ALTITUDE COMPENSATED SPEED AND FUELING ESTIMATE | ft-lbs |
| TQ_LOALT_TERM | | SLEWED LOW ALTITUDE COMPENSATED SPEED AND FUELING ESTIMATE | ft-lbs |
| TQ_DTQ_DICP | | CHANGE IN TORQUE FOR A GIVEN CHANGE IN INJECTION CONTROL PRESSURE | MPa/ft-lbs |
| TQ_ICP_PUMP | | CALCULATED PARASITIC LOSSES DUE TO DEVIATIONS IN MEASURED ICP (ICP_MPA) FROM BASELINE ICP | ft-lbs |
| TQ_RAW | | ALTITUDE COMPENSATED SPEED AND FUELING BASED TORQUE ESTIMATE | ft-lbs |
| TQ_COMB | | AIR TO FUEL RATIO COMPENSATED TORQUE ESTIMATE | ft-lbs |
| TQ_COMB_MULT | | AIR TO FUEL RATIO MULTIPLIER OF SPEED AND FUELING BASED TORQUE | SCALAR |
| TQ_PUMP | | OVERALL PUMPING LOSSES ASSOCIATED WITH AIR AND ICP SYSTEMS | ft-lbs |
| TQ_FRICTION | | OVERALL PARASITIC LOSSES DUE TO ENGINE FRICTION | ft-lbs |
| TQ_ENGFAN | | PARASITIC LOSSES DUE TO ENGINE FAN BEING ENGAGED | ft-lbs |
| TQ_AIRC1 | | PARASITIC LOSSES DUE TO PRIMARY AIR CONDITIONING UNIT | ft-lbs |
| TQ_AIRC2 | | PARASITIC LOSSES DUE TO SECONDARY AIR CONDITIONING UNIT | ft-lbs |
| TQ_ACCY1 | | PARASITIC LOSSES DUE TO PRIMARY ACCESSORY LOADS | ft-lbs |
| TQ_ACCY2 | | PARASITIC LOSSES DUE TO SECONDARY ACCESSORY LOADS | ft-lbs |
| TQ_ACCESSORIES | | OVERALL PARASITIC LOSSES DUE TO ACCESSORIES | ft-lbs |
| TQ_SS_MEAN | | STEADY-STATE TORQUE ESTIMATE | ft-lbs |
| TQ_ND_RAW | | UNFILTERED DERIVATIVE OF ENGINE SPEED | RPM/sec |
| TQ_ND | | FILTERED DERIVATIVE OF ENGINE SPEED | RPM/sec |
| TQ_TRANS | | UNFILTERED TRANSIENT TORQUE ESTIMATE | ft-lbs |
| TQ_TAU | | TRANSIENT FILTER SPEED-BASED TIME CONSTANT | $sec^{-1}$ |

ENGINE TORQUE CALCULATION

FIELD OF THE INVENTION

This invention relates to a system and method for real time calculation of the net torque output of an internal combustion engine. The invention is useful in the operation of diesel engines that power automotive vehicles such as trucks.

BACKGROUND AND SUMMARY OF THE INVENTION

An automotive vehicle, such as a medium or heavy truck that is powered by a diesel engine, may comprise an electronic engine control that exercises control over certain aspects of engine operation. The ability of such an engine to perform in a desired manner may at times depend on its ability to meet certain torque demands. Hence, data that accurately calculates, in real time, the net torque being produced by a running engine is an important consideration in strategies for controlling engine and/or vehicle operation.

This invention relates to a system and method for real time calculation of the net torque output of an internal combustion engine. The invention is useful in the operation of diesel engines that power automotive vehicles such as trucks.

In a diesel engine net torque output is dependent on engine speed and fueling. It is also a function of other variables such as mass air and losses resulting from running of the engine. Certain constraints that are inherent in a microprocessor-based engine control, such as data storage capacity, data access speed, and data processing speed, may not allow processing of certain variable parameter data and engine model data sufficiently fast to provide sufficiently accurate real-time torque estimate suitable for control purposes.

The present invention endows an electronic engine control with an ability to develop engine net torque output data that correlates reasonably accurately in real time with the actual net torque output of a running engine. An ability to accurately develop accurate data in real time is believed to afford engine designers more and better opportunities for closer control of certain engine and/or vehicle functions. For example, accurate real-time engine net output torque data may be used to provide better definition for transmission shift points, particularly automatic transmission shift points. Such data may also be a useful input to a vehicle traction control system. It may also serve as a useful diagnostic or maintenance tool.

A diesel engine may also be modeled using certain engine-related parameters, most, if not all, of which are variables. Mean torque developed by an engine is primarily a function of fuel injected into its cylinders for combustion, but is also influenced by other factors some of which are measured and others of which are unmeasured. Such influences include, for example, fuel injection timing, engine speed, cylinder wall temperature, air-fuel ratio, intake pressure, intake temperature, fuel cetane number, fuel injection pressure, etc.

Accordingly, it is believed that in order to create an electronic engine control that is both practical to implement and capable of providing reasonably accurate torque measurement in real time, various factors must be reconciled. For example, a system and method that perhaps possesses a somewhat lesser degree of accuracy may nonetheless be acceptable if it does not have to be re-calibrated should the engine EGR rates be changed.

For developing a calculation of real-time net torque output of a running engine, meaning the torque that is present at the output of the engine for operating the drivetrain to propel vehicle, certain torques must be subtracted as losses from a base (gross) torque calculation. Such losses include accessory torques, like those required to operate an air conditioner compressor and cooling fan, and pumping torques, like those required to operate a pump that pressurizes hydraulic fluid for operating various devices on the engine such as high-pressure fuel injectors and those that are inherent in the pumping action of the internal mechanism of the engine. Torque lost due to mechanical friction is another subtraction from gross torque production of a running engine.

Certain transient changes that occur during running of an engine in a motor vehicle have transient effects on gross and net torque, and so it may also be appropriate to take them into account when calculating torques.

One aspect of the present invention relates to accounting for certain transient effects.

Other aspects of the invention relate to compensation for losses such as those described above.

A general aspect of the invention relates to a torque calculation method for providing real time data that measures net torque output of a running engine at a rotating member of the engine.

The method comprises: processing data that includes engine speed data and engine fueling data to create engine gross torque data for the running engine; processing data related to torque losses due to running of the engine to create engine running torque loss data; processing engine speed data to create engine acceleration and deceleration data; and processing the engine acceleration and deceleration data with data defining a moment of inertia attributable to the rotating member and engine mechanism coupled to that member to create data measuring inertial torque.

The inertial torque data is algebraically added to, and the engine running torque loss data is subtracted from, the engine gross torque data to create engine net running torque data. The engine net running torque data and engine speed data are processed according to a filter algorithm that compensates the engine net running torque data for engine speed.

Another aspect relates to an operating system that embodies the general method just described.

Still another aspect relates to a motor vehicle embodying a method and operating system as described where transmission shifting is controlled by the speed-compensated engine net running torque data.

The foregoing, along with further features and advantages of the invention, will be seen in the following disclosure of a presently preferred embodiment of the invention depicting the best mode contemplated at this time for carrying out the invention. The disclosure includes accompanying drawings, briefly described as follows.

BRIEF DESCRIPTION OF THE DRAWINGS

FIGS. 2A and 2B constitute a table of input, local, and output variable parameters, and scalar parameters, involved in calculations performed by the inventive calculator.

DESCRIPTION OF THE INVENTION

Figure 1A:
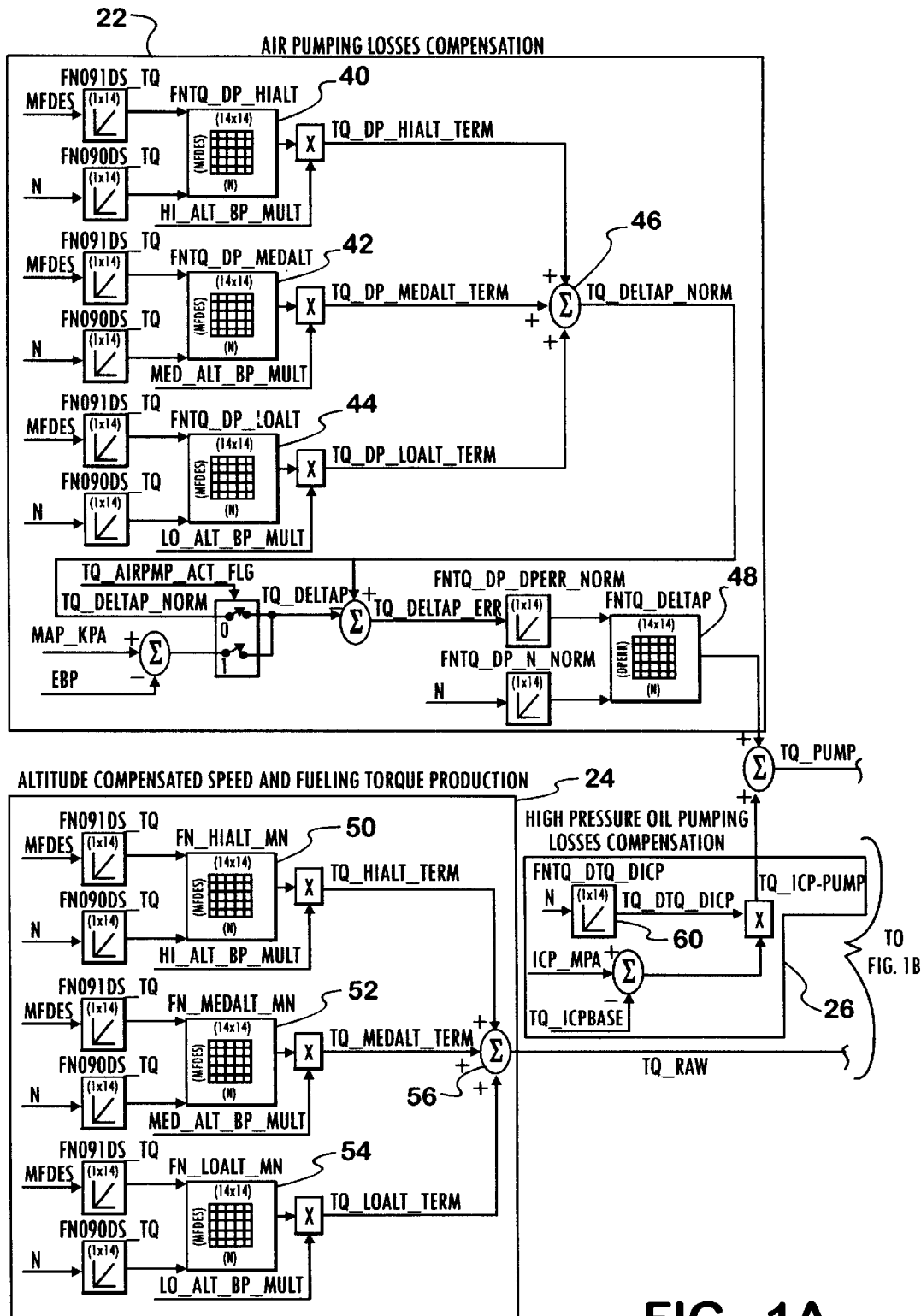
FIGS. 1A and 1B collectively constitute a schematic diagram representing an exemplary software implementation of the inventive calculator in an electronic engine control comprising a processor for processing data to develop torque data.
Figure 1B:
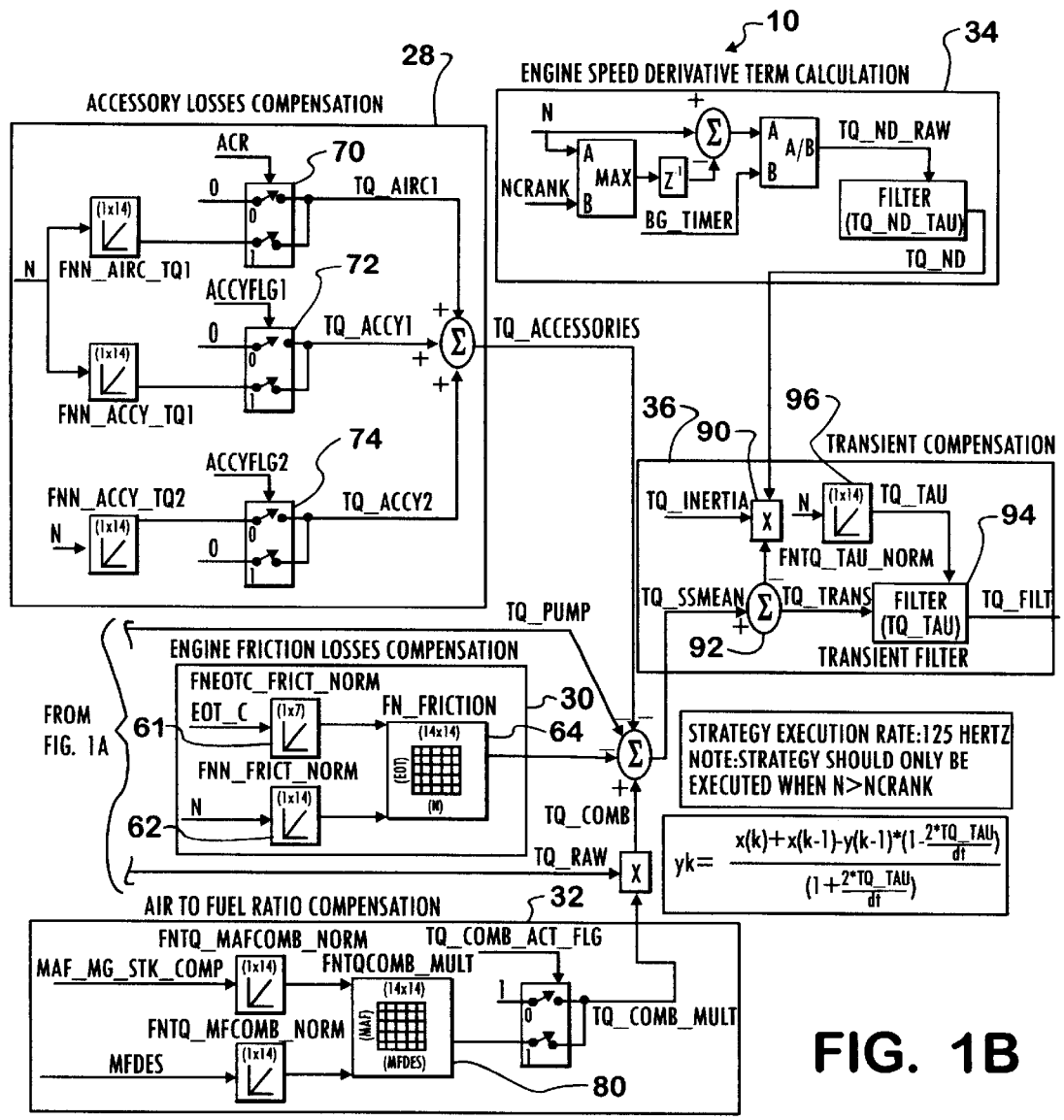

FIGS. 1A and 1B show an implementation of the inventive torque calculator 10 in an electronic engine control of an internal combustion engine in a motor vehicle, a diesel engine in particular. FIGS. 2A and 2B show fifteen input variables to, and a single output variable from, torque calculator 10. A number of local variables are also present in FIGS. 2A and 2B.

Calculator 10 processes the input variables according to the strategy of FIGS. 1A and 1B to develop the output variable TQ_FILT, which represents the real-time net output torque of the engine.

For convenience, FIGS. 1A and 1B are organized into several general sections: an air pumping loss compensation section 22; an altitude compensated speed and fueling torque production section 24; a high pressure oil pumping loss compensation section 26; an accessory losses compensation section 28; an engine friction loss compensation section 30; and air to fuel ratio compensation section 32; an engine speed derivative term calculation section 34; and a transient compensation section 36.

Air pumping loss compensation section 22 calculates torque lost due to the inherent air pumping action of a running engine. Three look-up tables 40, 42, 44 are used in development of an altitude compensated boost-back pressure difference baseline TQ_DELTAP_NORM. The three tables are calibrated for high, medium, and low altitudes. When the vehicle is being driven at high altitudes, table 40 is used to compensate for the prevailing high altitude; at medium altitudes, table 42 is used; and at low altitudes, table 44 is used. Normalized values of engine speed N and engine fueling MFDES are inputs to each table. The variables HI_ALT_BP_MULT, MED_ALT_BP_MULT, and LO_ALT_BP_MULT are used to slew between tables when altitude changes from the range of one table to the range of another.

The outputs of the three tables are algebraically summed (reference numeral 46) to create a value for TQ_DELTAP_NORM representing a normal pressure difference across the engine. The three look-up tables and the slewing function are equivalent to a single larger look-up table that would span the entire altitude range.

When section 22 is compensating for air pumping loss, the difference between manifold absolute pressure MAP_KPA and exhaust back pressure EBP_KPA is algebraically subtracted from TQ_DELTAP_NORM to create an error TQ_DELTAP_ERR. Normalized values of TQ_DELTAP_ERR and engine speed N are inputs to a fourth look-up table 48. Each set of normalized values of TQ_DELTAP_ERR and engine speed N defines a respective value of air pumping loss, and that value is provided as TQ_AIR_PUMP.

Section 22 compensates for certain variables such as turbo windup, engine-to-engine variability, and engine wear. When a baseline engine is mapped using various combinations of engine speed and engine fueling to provide baseline data for storage in the electronic engine control, a corresponding steady state value for the difference between manifold absolute pressure in the engine intake manifold and exhaust back-pressure in the engine exhaust manifold for each combination of speed and fueling data is measured. Data values for the pressure difference are entered in tables 40, 42, and 44.

Altitude compensated speed and fueling torque production section 24 comprises three look-up tables 50, 52, and 54. These three tables are calibrated for high, medium, and low altitudes in the same way as tables 40, 42, and 44. The variables HI_ALT_BP_MULT, MED_ALT_BP_MULT, and LO_ALT_BP_MULT are used to slew between the tables when altitude changes from the range of one table to the range of another. The outputs of the three tables are algebraically summed to create a value for TQ_RAM representing an altitude compensated base (gross) torque production of the engine.

The data input MFDES represents desired mass fuel injection into the engine and may be obtained from a sensor operated by an accelerator input. Such a sensor may sometimes be referred to as an accelerator position sensor. The data input N represents engine speed and may be obtained from any suitable source in the vehicle. Engine speed is typically published on a data bus of the vehicle and updated at an appropriate update rate. Each look-up table 50, 52, 54 correlates each of various combinations of mass fuel input and engine speed to a corresponding base torque production for the corresponding altitude range. The outputs of the three tables are algebraically summed (reference numeral 56) to create a value for TQ_RAW representing gross torque production of the engine. The three look-up tables and the slewing function are equivalent to a single larger look-up table that would span the entire altitude range.

A high-pressure pump that provides hydraulic power for operating certain devices on the engine such as the fuel injectors imposes a torque loss that must be subtracted from gross torque production when calculating net torque output. High pressure oil pumping loss compensation section 26 calculates torque lost due to such pumping. The magnitude of the pumping loss is calculated using engine speed and the pressure developed by the pump in a high-pressure rail that serves the fuel injectors. That pressure is given by the variable input ICP_MPA. The torque loss that occurs at a base pressure TQ_ICPBASE is subtracted from ICP_MPA, with the difference forming a multiplier for a value TQ_DTQ_DICP determined from a function generator 60. Function generator 60 correlates pumping torque loss with engine speed, and by using engine speed N as an input, function generator 60 outputs the corresponding torque loss.

Base oil pressure ICPBASE is determined as the engine is being motored and the value for TQ_ICPBASE represents the corresponding torque lost due to operation of the pump at that base pressure. With the oil pump being mechanically driven by the engine, the actual torque that the pump draws is a function of both engine speed as well as oil pressure.

Engine friction loss compensation section 30 uses engine temperature and speed to calculate friction loss. Engine temperature has an effect on torque because running friction changes with temperature. Engine oil temperature EOT_C is an input to a function generator 60 that correlates certain friction changes with temperature, and engine speed N is an input to a function generator 62 that correlates certain friction changes with engine speed. The outputs of the two function generators are inputs to a look-up table 64 that contains values of torque loss due to friction with sets of values of the outputs of the two function generators. Like engine speed data, engine operating temperature data is published on the data link.

Accessory losses compensation section 28 comprises several function generators 70, 72, 74, 76, 78, each of which correlates with a respective accessory and represents the torque that is drawn from the engine to operate that accessory as a function of engine speed. Engine speed N forms an input to each respective function generator. Because the respective accessory draws torque from the engine only when the accessory is operating, the torque loss for a particular accessory forms a contribution to accessory torque loss compensation only when the accessory is operating. Hence, the contribution of each function generator is controlled by a respective switch. Only when the accessory is operating does the respective switch allow its contribution to be added to the output of section 28.

Changes in air-fuel ratio can influence torque production. Air to fuel ratio compensation section 32 comprises a look-up table 80 using the compensated mass air flow signal MAF_MG_STK_COMP and desired mass fuel MFDES as inputs to determine a combustion torque multiplier TQ_COMB_MULT for the gross torque TQ_RAW due to changes in air-fuel ratio.

Engine speed derivative term calculation section 34 calculates the derivative of engine speed with respect to time, in other words engine acceleration and deceleration. A previous value of the engine speed is subtracted from a current value of engine speed to determine the change in engine speed since the last iteration. This difference is divided by the execution rate of the software (125 hz for example). The signal is filtered and the filtered derivative term is supplied to transient compensation section 36 for use in transient compensation.

Transient compensation section 36 compensates for acceleration and deceleration of the inertial mass of the engine mechanism as engine speed changes. Section 34 calculates rate of change of engine speed (represented by the data value N_DER), which is positive when the engine is accelerating and negative when the engine is decelerating. The rotating mass of the engine has a moment of inertia that is defined by the nature of the engine mechanism. Data for the moment of inertia is given by a value for the parameter TQ_INERTIA. When that value is multiplied (reference numeral 90) by rate of change of engine speed from section 34, the result is the change in engine torque due to engine acceleration or deceleration. Because acceleration and deceleration are inherently transient in nature as the engine operates, their occurrence inherently imparts transients to net engine torque output of the engine. Accordingly, section 36 algebraically subtracts (reference numeral 92) the product of N_DER and TQ_INERTIA from TQ_SSMEAN to yield a difference value represented by the parameter TQ_TRANS. That parameter is then filtered by a filter algorithm 94 that serves basically to attenuate high frequency components.

The filter algorithm is fast enough to perform the filter function in real time with reasonable accuracy. Because of the range of possible engine speeds, it is most advantageous to compensate the filter function for engine speed. Accordingly, the function is adjusted by a function generator FNTQ_TAU_NORM (reference numeral 96) according to the value of engine speed N. Function generator 96 supplies the value of a compensation parameter TQ_TAU.

The particular filter algorithm is given by the following:

$$y(k) = \frac{x(k) + x(k-1) - y(k-1) * \left(1 - \frac{2\tau}{dt}\right)}{\left(1 + \frac{2\tau}{dt}\right)}$$

where:

$y(k)$ = TQ_FILT (the curent value of the filter output)

-continued $y(k-1)$ = TQ_FILT previous (the previous value of the filter output)

$x(k)$ = TQ_TRANS (the current value of the filter input)

$x(k-1)$ = TQ_TRANS previous (the previous value of the filter input)

$dt$ = BG_TIMER (the time step since last execution - 125 msec)

$\tau$ = TQ_TAU (the filters's time constant compensated for engine speed)

Figure 3:
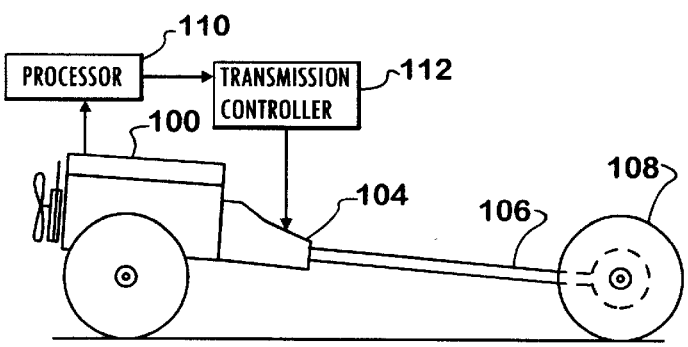
FIG. 3 is a schematic diagram of a motor vehicle comprising an operating system that includes the inventive calculator.

The torque calculator of the present invention has been proven capable of providing real time torque measurement that is accurate to within +/−10% or 20 foot-pounds, whichever is greater, in certain engines, and is believed capable of doing so in other engines. It can be used in control of shifting of a transmission in a motor vehicle, such as portrayed schematically in FIG. 3. An engine 100, a diesel engine for example, powers the motor vehicle through a transmission 104 and a drivetrain 106 that includes driven wheels 108. The engine output is coupled to the transmission input, and so the net torque output from the engine forms the torque input to the transmission. By accurately measuring the engine net torque output, as provided by an operating system that includes a processor 110 that has a torque calculator according to the present invention, the net torque input to the transmission is made available to a transmission controller 112. The transmission controller can then uses that data in shifting the transmission. Shift quality and transmission performance can be improved with the availability of more accurate torque input information.

While a presently preferred embodiment of the invention has been illustrated and described, it should be appreciated that principles of the invention are applicable to all embodiments and uses that fall within the scope of the following claims.

What is claimed is:

1. A torque calculation method for providing real time data that measures net torque output of a running engine at a rotating member of the engine, the method comprising:

processing data that includes engine speed data and engine fueling data to create engine gross torque data for the running engine;

processing data related to torque losses due to running of the engine to create engine running torque loss data;

processing engine speed data to create engine acceleration and deceleration data;

processing the engine acceleration and deceleration data with data defining a moment of inertia attributable to the rotating member and engine mechanism coupled to that member to create data measuring inertial torque;

algebraically adding the inertial torque data to, and subtracting the engine running torque loss data from, the engine gross torque data to create engine net running torque data; and processing the engine net running torque data and engine speed data according to a filter algorithm that compensates the engine net running torque data for engine speed.

2. A method as set forth in claim 1 wherein the step of processing the engine net running torque data according to a filter algorithm that is compensated for engine speed comprises processing the engine net torque running data according to the algorithm:

$$y(k) = \frac{x(k) + x(k-1) - y(k-1) * \left(1 - \frac{2\tau}{dt}\right)}{\left(1 + \frac{2\tau}{dt}\right)}$$

where:

$y(k)$ = TQ_FILT (the curent value of the filter algorithm output)

$y(k-1)$ = TQ_FILT previous (the previous value of the filter algorithm output)

$x(k)$ = TQ_TRANS (the current value of the input to the filter algorithm)

$x(k-1)$ = TQ_TRANS previous (the previous value of the input to the filter algorithm)

$dt$ = BG_TIMER (the time step since last execution of the algorithm)

$\tau$ = TQ_TAU (the filter algorithm's time constant compensated for engine speed).

3. A method as set forth in claim 1 wherein the step of processing data related to torque losses due to running of the engine to create engine running torque loss data comprises processing data relevant to torque loss due to engine air pumping, data relevant to torque loss due to operation of engine-driven accessories, data relevant to torque loss due to engine oil pumping, and data relevant to engine running friction to create engine air pumping torque loss data, engine-driven accessory torque loss data, engine oil pumping torque loss data, and engine running friction torque loss data, and using the engine air pumping torque loss data, the engine-driven accessory torque loss data, the engine oil pumping torque loss data, and the engine running friction torque loss data as subtractions from engine gross torque data.

4. A method as set forth in claim 1 wherein the step of processing data that includes engine speed data and engine fueling data to create engine gross torque data for the running engine includes compensating the gross torque data for changes in altitude.

5. A method as set forth in claim 1 wherein the step of processing data that includes engine speed data and engine fueling data to create engine gross torque data for the running engine includes compensating the gross torque data for changes in engine air-fuel ratio.

6. A method as set forth in claim 1 including the step of using the speed-compensated engine net running torque data in controlling shifting of a transmission through which the engine powers a motor vehicle.

7. An internal combustion engine operating system comprising:

a processor for providing real time data that measures net torque output of a running engine at a rotating member of the engine, wherein the engine processor operates:

to process data that includes engine speed data and engine fueling data to create engine gross torque data for the running engine;

to process data related to torque losses due to running of the engine to create engine running torque loss data;

to process engine speed data to create engine acceleration and deceleration data;

to process the engine acceleration and deceleration data with data defining a moment of inertia attributable to the rotating member and engine mechanism coupled to that member to create data measuring inertial torque;

to algebraically add the inertial torque data to, and subtract the engine running torque loss data from, the engine gross torque data to create engine net running torque data; and to process the engine net running torque data and engine speed data according to a filter algorithm that compensates the engine net running torque data for engine speed.

8. An internal combustion engine operating system as set forth in claim 7 wherein the processor processes the engine net running torque data according to the algorithm:

$$y(k) = \frac{x(k) + x(k-1) - y(k-1) * \left(1 - \frac{2\tau}{dt}\right)}{\left(1 + \frac{2\tau}{dt}\right)}$$

where:

$y(k)$ = TQ_FILT (the curent value of the filter algorithm output)

$y(k-1)$ = TQ_FILT previous (the previous value of the filter algorithm output)

$x(k)$ = TQ_TRANS (the current value of the input to the filter algorithm)

$x(k-1)$ = TQ_TRANS previous (the previous value of the input to the filter algorithm)

$dt$ = BG_TIMER (the time step since last execution of the algorithm)

$\tau$ = TQ_TAU (the filter algorithm's time constant compensated for engine speed).

9. An internal combustion engine operating system as set forth in claim 7 wherein the processor processes data related to torque losses due to running of the engine to create engine running torque loss data comprises processing data relevant to torque loss due to engine air pumping, data relevant to torque loss due to operation of engine-driven accessories, data relevant to torque loss due to engine oil pumping, and data relevant to engine running friction to create engine air pumping torque loss data, engine-driven accessory torque loss data, engine oil pumping torque loss data, and engine running friction torque loss data, and subtracts the engine air pumping torque loss data, the engine-driven accessory torque loss data, the engine oil pumping torque loss data, and the engine running friction torque loss data from engine gross torque data.

10. An internal combustion engine operating system as set forth in claim 7 wherein the processor processes data that includes engine speed data and engine fueling data to compensate the engine gross torque data for changes in altitude.

11. An internal combustion engine operating system as set forth in claim 7 wherein the processor processes data that includes engine speed data and engine fueling data to compensate the engine gross torque data for changes in engine air-fuel ratio.

12. A motor vehicle comprising:
an internal combustion engine,
a drivetrain coupled to the engine through a transmission, and
an operating system comprising:
   a processor for providing real time data that measures net torque output of the running engine available for input to the transmission,
   wherein the engine processor operates:
      to process data that includes engine speed data and engine fueling data to create engine gross torque data for the running engine;
      to process data related to torque losses due to running of the engine to create engine running torque loss data;
      to process engine speed data to create engine acceleration and deceleration data;
      to process the engine acceleration and deceleration data with data defining a moment of inertia attributable to the rotating member and engine mechanism coupled to that member to create data measuring inertial torque;
      to algebraically add the inertial torque data to, and subtract the engine running torque loss data from, the engine gross torque data to create engine net running torque data; and
      to process the engine net running torque data and engine speed data according to a filter algorithm that compensates the engine net running torque data for engine speed; and
   the transmission shifting is controlled by the speed-compensated engine net running torque data.

13. A motor vehicle as set forth in claim 12 wherein the processor processes the engine net running torque data according to the algorithm:

$$y(k) = \frac{x(k) + x(k-1) - y(k-1)*\left(1 - \frac{2\tau}{dt}\right)}{\left(1 + \frac{2\tau}{dt}\right)}$$

where:

$y(k)$ = TQ_FILT (the curent value of the filter algorithm output)

$y(k-1)$ = TQ_FILT previous (the previous value of the filter algorithm output)

$x(k)$ = TQ_TRANS (the current value of the input to the filter algorithm)

$x(k-1)$ = TQ_TRANS previous (the previous value of the input to the filter algorithm)

$dt$ = BG_TIMER (the time step since last execution of the algorithm)

$\tau$ = TQ_TAU (the filter algorithm's time constant compensated for engine speed).

14. A motor vehicle as set forth in claim 12 wherein the processor processes data related to torque losses due to running of the engine to create engine running torque loss data comprises processing data relevant to torque loss due to engine air pumping, data relevant to torque loss due to operation of engine-driven accessories, data relevant to torque loss due to engine oil pumping, and data relevant to engine running friction to create engine air pumping torque loss data, engine-driven accessory torque loss data, engine oil pumping torque loss data, and engine running friction torque loss data, and subtracts the engine air pumping torque loss data, the engine-driven accessory torque loss data, the engine oil pumping torque loss data, and the engine running friction torque loss data from engine gross torque data.

15. A motor vehicle as set forth in claim 12 wherein the processor processes data that includes engine speed data and engine fueling data to compensate the engine gross torque data for changes in altitude.

16. A motor vehicle as set forth in claim 12 wherein the processor processes data that includes engine speed data and engine fueling data to compensate the engine gross torque data for changes in engine air-fuel ratio.

* * * * *